United States Patent Office 3,184,394
Patented May 18, 1965

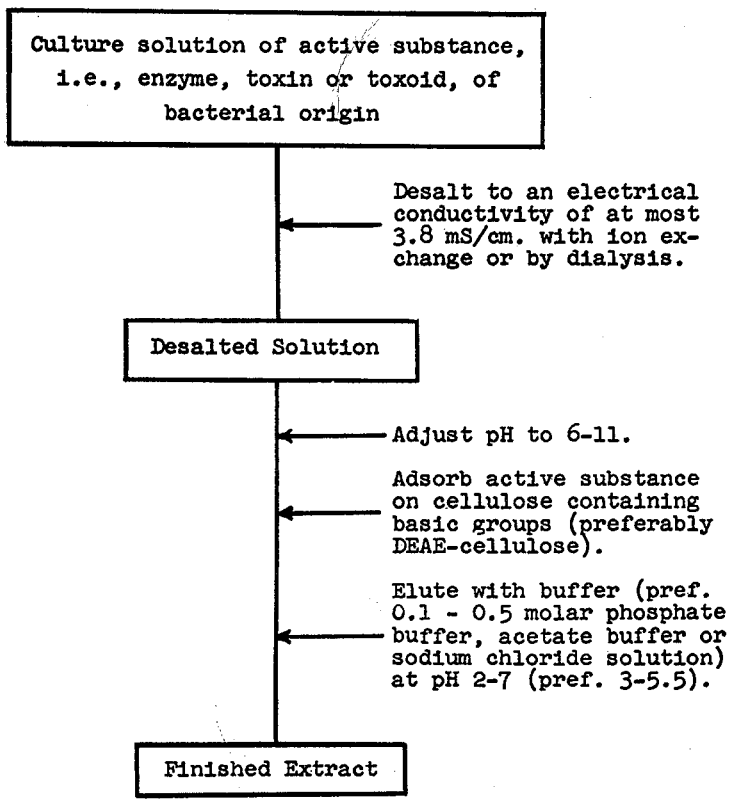

3,184,394
PROCESS FOR THE PREPARATION OF ENZYMES, TOXINS AND TOXOIDS
Rudolf Schmidtberger and Hans-Gerhard Schwick, Marburg (Lahn), and Wolfgang von Pölnitz, Frankfurt am Main, Germany, assignors to Behringwerke Aktiengesellschaft, Marburg (Lahn), Germany, a corporation of Germany
Filed June 4, 1962, Ser. No. 199,657
Claims priority, application Germany, Feb. 17, 1959, B 52,137
16 Claims. (Cl. 195—66)

The present application is a continuation-in-part application of our application Ser. No. 8,915, filed February 16, 1960, now abandoned.

The object of the present invention is to enrich or to prepare enzymes, toxins and toxoids of bacterial origin from solutions in which they are contained.

There are known processes for the preparation of biologically active substances such as streptokinase and other enzymes secreted by streptococci, toxins and toxoids, for example the tetanus toxoid, according to which the active substances are adsorbed from their solutions, while maintaining certain pH values, on kieselguhr, glass wool, aluminium hydroxide gel, alumina, silica gel and alpha-cellulose, and are eluated again for the purpose of purification.

The publication in J. Am. Chem. Soc. 78, 751 (1956), describes the adsorption of proteins on cellulose containing basic groups, whereby serum proteins served as substrata. Bacterial nutrition products have hitherto not been subjected to the adsorption on diethyl-amino-ethyl cellulose, all the more since there exists only partial clarity about the chemical nature of the substances, and their behaviour in such a process has not been known. The isolation of a substance from a culture filtrate with DEAE-cellulose has also not been described until now.

Now, we have found that enzymes, toxins and toxoids can be obtained by desalting solutions containing these active substances by means of ion exchangers or by dialysis until a specific electric conductivity of at most 3.8 ms./cm., preferably to 0.7 ms./cm.—depending on the protein to be treated—is obtained, adjusting them to a pH value between 6 and 11, adsorbing the active substances contained in the solutions thus obtained in vessels, while stirring, or in columns, on cellulose containing basic groups, preferably diethyl-amino-ethyl groups, eluting the active substances in known manner at pH values between 2 and 7, preferably between 3 and 5.5 with 0.1 to 0.5 molar buffer solutions, especially phosphate or acetate buffers, or with 0.1 to 0.5 molar sodium chloride solution and, if desired, further working up according to known processes. With the process of the present invention a substance has been isolated for the first time from a culture filtrate by chromatography on DEAE-cellulose.

Furthermore, we have found that an additional purifying effect can be attained if, prior to the elution of the active substances, impurities are eliminated in the acid pH range by means of buffer solutions, for example, glycocoll or citrate buffers the ionic strength of which is higher than that of the buffer during the adsorption process. The amount of the cellulose used for adsorption depends on the enzyme and electrolyte content of the solution. Generally, however, it does not exceed 5 grams/liter of the partially desalted solution.

The buffer eluates which contain the biological substance are freed in known manner from low molecular constituents by dialysis or treatment in suitable mixtures of ion-exchangers and either dried directly or by lyophilization after preliminary concentration by suitable precipitants or ultra-filtration.

As enzymes, toxins and toxoids of bacterial origin there come into consideration: streptokinase, streptodornase, streptolysin, toxins from the Clostridium group such as tetanus toxin and botulism toxin, furthermore bacterial peptidases, proteinases, phosphatases, catalases, hemolysins, coagulase secreted by staphylococci, leucocidins, furthermore the corresponding toxoids of the toxins.

The following examples serve to illustrate the invention but they are not intended to limit it thereto.

Example 1

250 liters of a culture medium, being free from bacteriae, of a known, streptokinase-forming strain of streptococci of the group C with a total streptokinase content of 40 million Christensen units and a streptodornase content of 6.75 million units are desalted, while controlling the pH value and the conductivity, with 51.8 liters of a mixture from 18.2 liters of cation exchanger and 33.6 liters of anion exchanger in $H^{\circ}$- or $OH^{-}$-form respectively. The solution shows then a specific electric conductivity of 1.14 ms./cm. and a pH value of 8. After elimination of the ion exchanger the solution is treated with 400 grams of diethyl-amino-ethyl-cellulose and after 1 hour the solid phase is separated from the inactive, liquid phase. The enzyme is eluted four times with 2.5 liters each of a 0.2 molar phosphate buffer solution at a pH value of 5. The combined enzyme-containing extracts are neutralized with 1-N-sodium hydroxide solution, dialyzed until free from the electrolyte and lyophilized. They contain 32.5 million units of streptokinase and 3.25 million units of streptodornase.

Example 2

50 liters of a crude tetanus toxoid (14 flocculation units/milliliter) are desalted in an exchanger column filled with a mixture of a highly cross-linked cation exchanger based on polystyrene and containing sulfo groups (for example "Amberlite® IR–120") in $H^{\circ}$-form and with a highly cross-linked, aromatic anion exchanger containing quaternary ammonium groups (for example "Amberlite® IRA–410") in $OH^{-}$-form until a specific electric conductivity of 1.0 ms./cm. is obtained. The ion exchanger resins are eliminated by filtration and the filtrate is passed through a column of 400 grams of diethyl-amino-ethyl-cellulose. The toxoid adsorbed by the cellulose is eluted by means of 5000 milliliters of a 0.2 molar sodium chloride solution. 690,000 flocculation (units 138 flocculation units/milliliter) of tetanus toxoid could be determined in the eluate.

Example 3

50 liters of a crude diphtheria toxoid (30 flocculation units/milliliter) are desalted by addition of 11 liters of a mixture of a highly cross-linked cation exchanger based on polystyrene and containing sulfo groups (for example "Amberlite IR–120") in $H^{\circ}$ form and a highly cross-linked aromatic anion exchanger containing quaternary ammonium groups (for example "Amberlite IRA–410") on $OH^{-}$ form until a specific electric conductivity of 1.0 ms./cm. is obtained. The filtrate passes then through a column containing 400 grams of diethyl-amino-ethyl-celluose, the cellulose adsorbing the toxoid. After washing with 1 liter of distilled water, the elution is effected by means of 5,000 milliliters of a 0.2 molar sodium chloride solution. The purified diphtheria toxoid contains 1,250,000 flocculation units (250 flocculation units/milliliter).

Example 4

5.7 liters of a culture filtrate containing 2.1 million Christensen units of streptokinase, 30,000 units of streptokinase per milligram of nitrogen and 19.1 milligram of carbohydrate per milligram of nitrogen are dialyzed at 4° C. against a 0.005 molar sodium phosphate solution, pH 7.0, until the equilibrium is attained. The solution obtained is passed through a column of 60 grams of diethyl-amino-ethyl-cellulose previously washed with a 0.005 molar sodium phosphate solution of pH 7.

The substances adsorbed by the cellulose derivative are then eluted with the use of a pH and salt gradient. The elution is carried out in such a manner that a phosphate buffer sodium chloride solution whose molarity is always increasing is run in, and in the end reaches a value of 0.2, referred to phosphate, and 0.2, referred to sodium chloride, while the pH values are decreasing, amounting finally to a pH value of 4.8. During the whole elution process there are collected fractions of 50 cc.

The samples are tested for their content of aromatic amino acid by measuring the absorption at 280 m$\mu$. It is found that certain maxima develop. The samples belonging to various maxima are mixed and then tested for their content of streptokinase, streptolysin and nitrogen.

It is found that the first fractions contain the whole of the streptolysin and the major part of the nitrogen. Streptokinase can only be detected in the two following fractions. The sterptokinase-containing mixtures are combined. They contain altogether 45% of the activity originally indicated with 940,000 Christensen units. As compared with the starting material there are found about 60,000 units per mg. of nitrogen; that means an increase of the activity per mg. of nitrogen by 100%. The carbohydrate content amounts to 4.2 mg. per nitrogen which means a reduction to about ⅕ as compared with the starting material.

*Example 5*

To 110 liters of a culture filtrate of chlorea vibrios containing 5.5 million units of neuraminidase methanol is added in order to enrich the neuraminidase and to form a precipitate. The precipitate is isolated and absorbed in 1 liter of a 0.005 molar sodium phosphate solution of pH 7.0 and dialyzed against a 0.005 molar sodium phosphate solution until a specific electric conductivity of 0.77 ms./cm. is attained. The precipitate is then passed through a column of diethyl-amino-ethyl-cellulose previously treated with a 0.005 molar sodium phosphate solution and subjected to chromatography with the use of a pH and a salt gradient (stage 1). The gradient is produced by allowing 20 liters of a 0.4 molar sodium phosphate solution of pH 5.2 to flow gradually and while stirring the solution in 20 liters of a 0.005 molar sodium phosphate solution of pH 7.0.

The eluate is collected in fractions of 100 cc. and tested for its neuraminidase activity. The active fractions are combined, methanol is added, as described in stage 1, until a precipitate is formed, the sediment is dissolved, dialyzed until a specific electric conductivity of 0.77 ms./cm. is attained, and once more subjected to chromatography in a column of diethyl-amino-ethyl-cellulose pretreated according to stage 1. The active eluates are then mixed and the neuraminidase is enriched by a methanol precipitate. The precipitate is separated by centrifugation from the inactive decanted substances and diluted up to a content of 100 units of neuraminidase per cc. with physiological saline adjusted at a pH of 5.5 by means of sodium acetate. In this way 49.5 liters containing 4.95 million units of neuraminidase, i.e. a yield of 90% are obtained.

The accompanying flow sheet depicts the above-described process.

We claim:

1. A process for the preparation of enzymes of bacterial origin, which comprises desalting the crude solutions containing these active substances until an electric conductivity of at most 3.8 ms./cm. is obtained, adjusting the solutions to a pH value of 6 to 11, adsorbing the active substances on diethyl-amino-ethyl-cellulose and eluting the active substances at a pH value of 2 to 7 by means of a 0.1 to 0.5 molar salt solution of the group consisting of a phosphate buffer solution, an acetate buffer solution and a sodium chloride solution.

2. A process as claimed in claim 1, which comprises desalting the crude solution until an electric conductivity of at most 3.8 ms./cm. is obtained by the application of ion exchangers.

3. A process as defined in claim 1, wherein the desalting is carried out by dialysis.

4. A process as claimed in claim 1, which comprises eliminating, prior to eluting the active substances, the impurities in the acid pH range by means of a buffer solution of the group consisting of a glycocoll buffer and a citrate buffer.

5. A process for the purification of streptokinase, which comprises desalting a crude solution thereof until an electrical conductivity of 1.14 ms./cm. is obtained, adjusting the solution to a pH value of 7 to 11, adsorbing the streptokinase on diethyl-amino-ethyl-cellulose and eluting the active substance at a pH value of 2 to 7 by means of a 0.2 to 0.5 molar salt solution of the group consisting of a phosphate buffer solution, an acetate buffer solution and a sodium chloride solution.

6. A process for the purification of tetanus toxoid, which comprises desalting a crude solution thereof until an electrical conductivity of 1.0 ms./cm. is obtained, adjusting the solution to a pH value of 7 to 11, adsorbing the tetanus toxoid on diethyl-amino-ethyl-cellulose and eluting the active substance at a pH value of 1 to 7 by means of a 0.2 to 0.5 molar salt solution of the group consisting of a phosphate buffer solution, an acetate buffer solution and a sodium chloride solution.

7. A process for the purification of diphtheria toxoid, which comprises desalting a crude solution thereof until an electrical conductivity of 1.0 ms./cm. is obtained, adjusting the solution to a pH value of 7 to 11, adsorbing the diphtheria toxoid on diethyl-amino-ethyl-cellulose and eluting the active substances at a pH value of 2 to 7 by means of a 0.2 to 0.5 molar salt solution of the group consisting of a phosphate buffer solution, an acetate buffer solution and a sodium chloride solution.

8. A process for the purification of neuraminidase, which comprises desalting a crude solution thereof until an electrical conductivity of 0.77 ms./cm. is obtained, adjusting the solution to a pH value of 7 to 11, adsorbing the neuraminidase on diethyl-amino-ethyl-cellulose and eluting the active substance at a pH value of 2 to 7 by means of a 0.2 to 0.5 molar salt solution of the group consisting of a phosphate buffer solution, an acetate buffer solution and a sodium chloride solution.

9. A process for the preparation of toxins of bacterial origin, which comprises desalting the crude solutions containing these active substances until an electric conductivity of at most 3.8 ms./cm. is obtained, adjusting the solutions to a pH value of 6 to 11, adsorbing the active substances on diethylamino-ethyl-cellulose and eluting the active substances at a pH value of 2 to 7 by means of a 0.1 to 0.5 molar salt solution of the group consisting of a phosphate buffer solution, an acetate buffer solution and a sodium chloride solution.

10. A process as defined in claim 9 wherein the desalting is carried out by the application of an ion exchanger.

11. A process as defined in claim 9 wherein the desalting is carried out by dialysis.

12. A process as defined in claim 9 which comprises eliminating, prior to eluting the active substances, the impurities in the acid pH range by means of a buffer solution of the group consisting of a glycocoll buffer and a citrate buffer.

13. A process for the preparation of toxoids of bacterial origin, which comprises desalting the crude solutions containing these active substances, until an electric conductivity of at most 3.8 ms./cm. is obtained, adjusting the solutions to a pH value of 6 to 11, adsorbing the active substances on diethylamino-ethyl-cellulose and eluting the active substances at a pH value of 2 to 7 by means of a 0.1 to 0.5 molar salt solution of the group consisting of a phosphate buffer solution, an acetate buffer solution and a sodium chloride solution.

14. A process as defined in claim 13 wherein the desalting is carried out by the application of an ion exchanger.

15. A process as defined in claim 13 wherein the desalting is carried out by dialysis.

16. A process as defined in claim 13 which comprises eliminating, prior to eluting the active substances, the impurities in the acid pH range by means of a buffer solution of the group consisting of a glycocoll buffer and a citrate buffer.

References Cited by the Examiner
UNITED STATES PATENTS

| | | | |
|---|---|---|---|
| 2,957,809 | 10/60 | Brink et al. | 167—73 |
| 2,974,088 | 3/61 | Lewis et al. | 167—72 |
| 2,997,425 | 8/61 | Singher et al. | 167—73 |

LEWIS GOTTS, *Primary Examiner*.

FRANK CACCIAPAGLIA, Jr., *Examiner*.